W. GALE.

STRAW CUTTER.

No. 3,912. Reissued Apr, 12, 1870.

Witnesses.

Geo. W. Roberts

Alfred W. Saylor

Inventor,

Warren Gale

United States Patent Office.

WARREN GALE, OF PEEKSKILL, NEW YORK, AND B. B. BELCHER, OF CHICOPEE FALLS, MASSACHUSETTS, ASSIGNEES OF WARREN GALE.

*Letters Patent No.* 31,001, *dated December* 18, 1860; *reissue No.* 1,977, *dated May* 30, 1865; *reissue No.* 2,127, *dated December* 19, 1865; *reissue No.* 3,912, *dated April* 12, 1870.

IMPROVEMENT IN STRAW-CUTTERS.

The Schedule referred to in these Letters Patent and making part of the same

Be it known that I, WARREN GALE, of Peekskill, in the State of New York, (formerly of Chicopee Falls, State of Massachusetts,) have made certain new and useful combinations, and certain other improvements applicable to Hand-lever Hay, Straw, and Feed-Cutters; and I do hereby declare that the following is a full and exact description, reference being had to the accompanying drawings and the letters of reference marked thereon.

In the drawings—

Similar letters designate like parts in the several figures.

My improvements relate to that class of cutters known as hand-lever feed-cutters, provided with a vibratory chopping-handle and stationary blade, against which the moving knife cuts; and consists First, in combining certain well-known devices used in feed-cutters, making a more efficient implement than when these parts are used in separate machines. The parts to be used in combination are a mouth-piece or stationary blade, made with an extension at one end to serve as a bearer of a chopping-handle, which is connected to the extension; the said chopping-handle having a bend at its heel-end, the other end extending past the cutter-box to serve as a handle to be grasped by the hand of the operator in working the machine. The moving knife is attached to the said handle, and so arranged as to make a gradual shear-cut against the blade.

Second, in providing a horizontal step placed at or nearly at right angles to the stationary blade, so as to allow of an angular adjustment of the moving knife, that is, to allow either end of the moving knife being set up to the stationary blade.

Third, in connecting this step to the mouth-piece or stationary blade, making a more rigid and permanent device than when these parts are not connected together.

Fourth, in certain other combinations of parts to be more particularly hereinafter described.

My improvements are mounted upon any suitable box or frame. As neither the box nor frame, nor the method of attaching the parts, after they are nected together, to the frame, constitutes any part of the invention, it will be sufficient to indicate their connection either permanently or removably to any suitable cutting-box or frame, supported on legs, and having side boards converging toward the cutting-end.

To such a box the working parts can be fastened by a few screws, and, if desired, can be removed for transportation without disturbing the adjustment between the moving knife and stationary blade.

Figure 1:
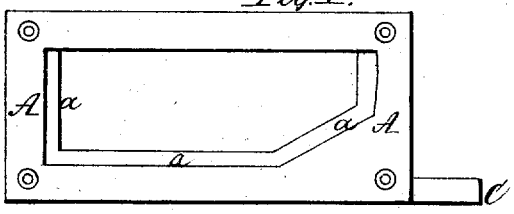
Figure 1 is a front view of the stationary blade and mouth-piece, with the extension C.
Figure 2:
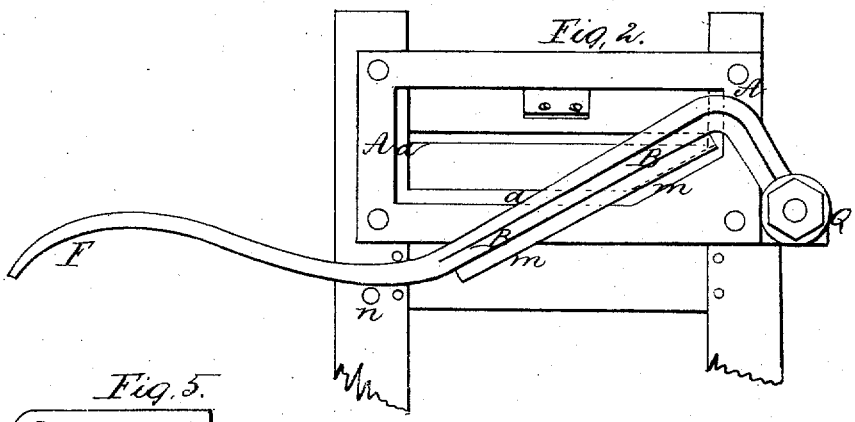
Figure 2 is a front elevation, representing the mouth-piece, stationary blade, and vibratory lever-knife in position on the cutter-box.
Figure 5:
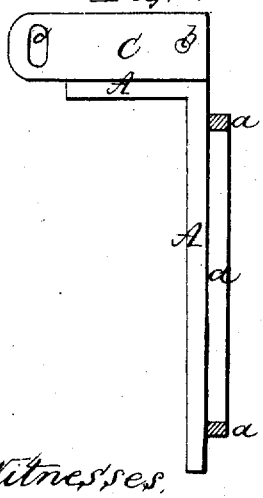
Figure 5 is a plan view of the adjustable flange pivot, which serves to make the connection between the horizontal step and chopping-handle.
Figure 3:
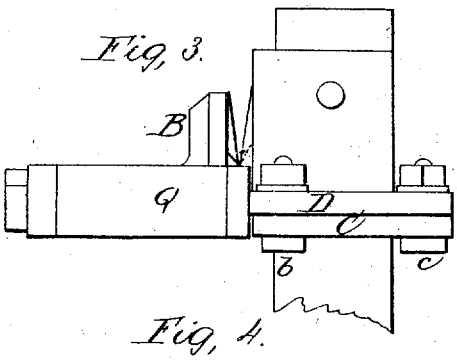
Figure 3 is a side elevation of the parts shown in fig. 2.
Figure 4:
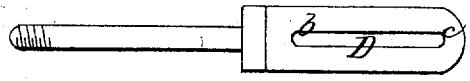
Figure 4 is a plan view of the mouth-piece and stationary blade, showing an extension at one end to serve as the bearing for a chopping-handle.

A proper form of the mouth-piece with a stationary blade attached, which is to be used in combination with the bent chopping-handle, is shown in fig. 1, A.

The essential feature of this mouth-piece is a stationary blade connected to the mouth-piece at *a a a*. The end of the mouth-piece is extended, to serve as a carrier for the bent chopping-handle.

The chopping-handle F B is constructed with an upward bend at its hinged end, and has the moving knife attached to the part B, while the other end of the handle F extends past the cutter-box, forming a handle to be grasped by the hand of the operator to move the handle and moving knife up and down while chopping.

The essential features that are to be always preserved, to come within the scope of my invention, when combined with the mouth-piece or stationary blade, are the bent portion at the hinged end, the moving knife attached to the part B, the part F of the handle to extend past the box, and the handle as a whole, so arranged in relation to the mouth-piece that the part of the moving knife toward the operator will shear against the stationary blade, finishing the cut at or near its heel end.

A chopping-handle, substantially so constructed with the moving-knife attached, and the handle being connected to the extension of the mouth-piece, make the combination constituting the first feature of my invention, and are a separate, distinct, and complete part of my invention, and do not embrace any special mode of hinging or pivoting the mouth-piece and handle together, or adjusting them after they are together.

The special method of connecting the bent handle to the extended part of the mouth-piece, and making the adjustments after they are together, is another part and distinct feature of my improvements, and that may or may not be used in combination with the first feature.

I am not aware that a mouth-piece and bent lever with moving knife attached, made substantially as described, have ever before been combined in the same machine. I limit my claim, however, to the combination when the handle and mouth-piece are made of metal.

This combination cheapens the construction, and makes a more efficient machine in use than when the stationary blade and handle are fastened to the frame separately; especially is this the case when a wooden frame is used that is liable to shrink or swell, causing a disarrangement of the cutting parts so desirable to be kept perfect in this class of cutters.

My improved method of connecting and adjusting the chopping-handle consists in providing the step C, so arranged in relation to the stationary blade that the handle, with moving knife attached, can be angularly adjusted on the step, so as to set up either end of the moving knife to the stationary blade in the process of construction, or to compensate for the wear in use.

It will be seen that when this step is constructed and arranged as described, it is complete of itself, and may or may not be used with the other improvements.

This horizontal step is made much more effective by having it attached to the stationary blade, as shown in fig. 1, letter A.

To make the connection between the step and chopping-handle, I provide the flanged pivot D. The flange extends over and rests on the step, and is secured in place by bolts or screws, or equivalent means. The holes through which the bolts pass are made large enough to allow the flange to be moved in or out, or to be angularly adjusted on the step, so that either end of the moving knife will be allowed to come to the stationary blade.

The best way to connect this flange to the chopping-handle is to have the pivot part pass through the chopping-handle, thus hinging the pivot and chopping-handle together; a nut and washer on the end of the pivot will secure the pivot and chopping-handle together.

I am aware the moving knife of feed-cutters has before been attached to a metal mouth-piece made with an extension to carry the moving knife, and the bent handle has been previously used, but in separate machines, and not in the same machine; therefore, they do not anticipate the combination I claim.

There is great advantage in combining these two important features in the same machine, resulting in a cheaper and a much more useful implement than when these parts are used in separate machines.

Having thus fully described my invention,

What I claim as new, and desire to secure by Letters Patent, is—

1. The bent metal chopping-handle F B, constructed substantially as described, with the moving knife attached to the part B, in combination with the metal mouth-piece with stationary-blade *a a* attached, and also provided with an extension at one end to serve as the carrier of the handle, substantially as described.

2. The step C, in combination with a chopping-handle of a lever feed-cutter, and so arranged as to allow of angular adjustment of the moving knife, substantially as described.

3. The step C, so constructed as to allow of the angular adjustment of the moving knife when said step is connected to the mouth-piece A or stationary blade, substantially as described.

4. The combination of the bent chopping-handle F B, mouth-piece A, or stationary blade *a a*, and horizontal step C, all combined and arranged substantially as described.

5. The combination of the step C and the flanged pivot D, so arranged and operated as to allow of the angular adjustment of the moving knife, substantially as described.

As witness my hand this 20th day of July, 1869.

WARREN GALE.

Witnesses:

L. C. GRUNDY,
O. H. AUSTIN.